United States Patent [19]

Hayward

[11] 4,145,729

[45] Mar. 20, 1979

[54] SURGE PROTECTOR ASSEMBLY

[75] Inventor: Robert D. Hayward, Phoenix, Ariz.

[73] Assignee: Gilbert Engineering Company, Inc., Phoenix, Ariz.

[21] Appl. No.: 881,752

[22] Filed: Feb. 27, 1978

[51] Int. Cl.[2] .......... H02H 1/04

[52] U.S. Cl. .......... 361/119; 361/120

[58] Field of Search .......... 361/111, 112, 117, 119, 361/120; 333/6, 8, 10, 11, 73 C

[56] References Cited

U.S. PATENT DOCUMENTS

| | | | |
|---|---|---|---|
| 3,274,447 | 9/1966 | Nelson | 361/119 |
| 3,777,219 | 12/1973 | Winters | 361/111 X |
| 3,863,111 | 1/1975 | Martzloff | 361/119 |
| 4,013,927 | 3/1977 | Gilberts | 361/119 |

*Primary Examiner*—Harry E. Moose, Jr.
*Attorney, Agent, or Firm*—Don J. Flickinger; John A. Robertson

[57] ABSTRACT

An electrically conductive outer body is provided with engagement means at one end thereof for connection to the access port of a fixed device within a cable transmission system. An inner body carrying a surge protector device is disposed within the outer body. The inner body is adjustably moveable to bring the surge protector device into contact with the electrical contact means normally accessible through the access port.

8 Claims, 6 Drawing Figures

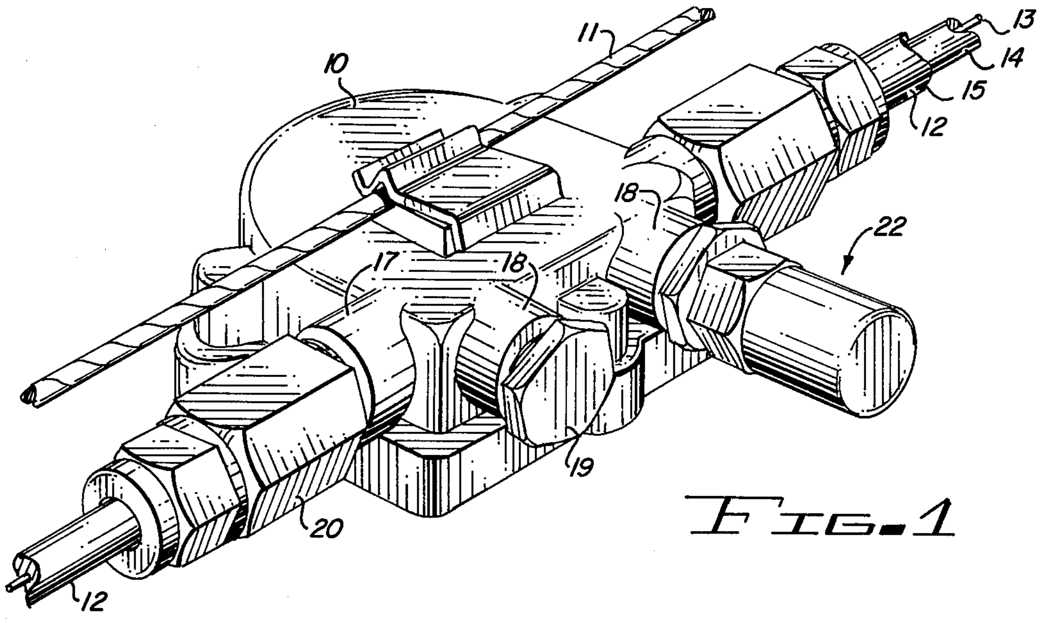
FIG. 1
FIG. 2
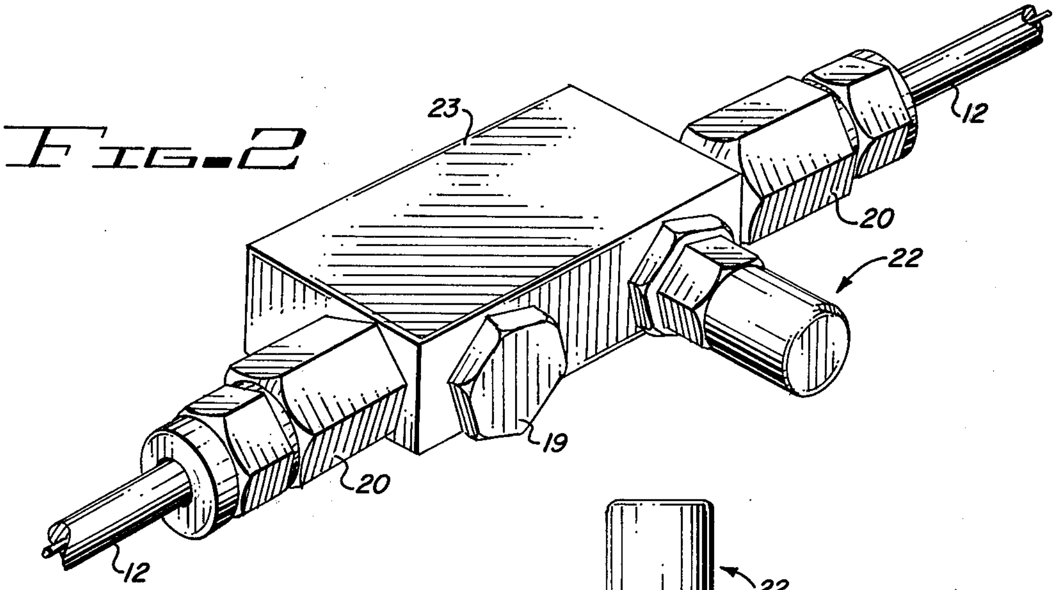
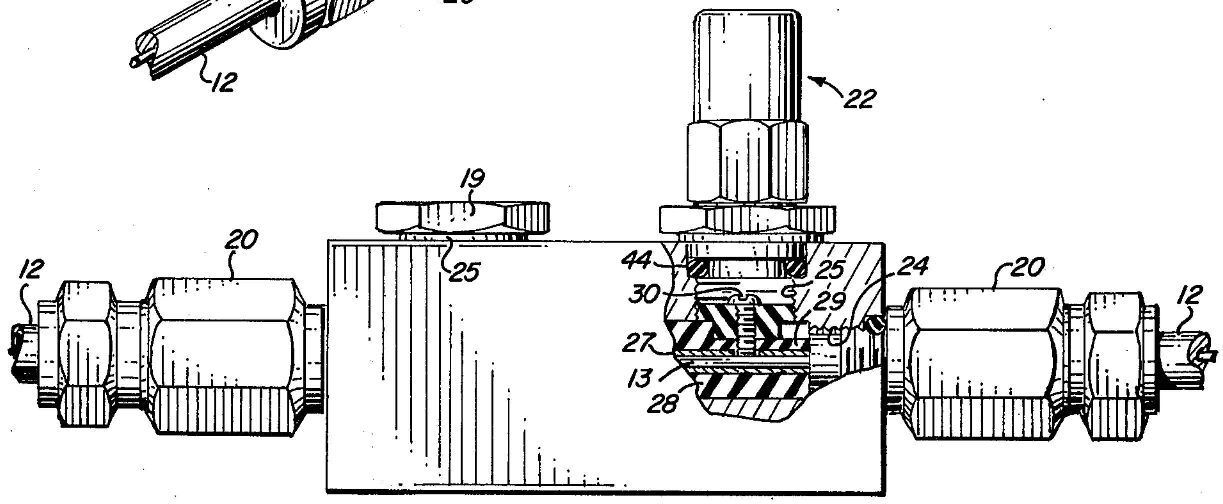
FIG. 3

SURGE PROTECTOR ASSEMBLY

This invention relates to cable transmission systems, such as cable antenna television.

More particularly, the instant invention concerns an assembly for the detachable installation of a surge protector device into the transmission system.

In a further aspect, the present invention concerns a surge protector assembly which is engageable with the normal access port of a conventional fixed device.

In a cable transmission system, such as a cable antenna television (CATV) system, the signal is commonly transmitted by means of an axial cable in airborne or underground installation. Various fixed devices, including amplifiers, directional taps and couplers, are periodically spaced along the transmission cable. The fixed devices are entered into the system by severing the cable, electrically and mechanically securing a connector assembly to each severed end of the cable and electrically and mechanically securing the cable connector assembly to the fixed device.

For the purpose of electro-mechanical connection with cable, the conventional fixed device is normally provided with an attachment port and an access port. The access port generally has an internal thread which matingly receives the connector assembly. The connector assembly has an electrically conductive body, which provides contact between the outer tubular conductor of the co-axial cable and the body of the fixed device. The center conductor of the co-axial cable generally protrudes beyond the connector assembly and is received by an electrical contact housed within the fixed device. Connection between the center conductor of the cable and the electrical contact means of the fixed device is made through the access port, which is normally sealed by a closure member.

Certain fixed devices, such as amplifiers and directional taps, are in the form of a hollow housing which encases various components and ancillary devices. An ancillary device of particular and immediate importance is the surge protector, the structure and function of which are well known in the art. In accordance with conventional practice, surge protectors are supplied with a pair of leads which are subsequently soldered to appropriate terminals within the fixed device. This arrangement has proven to be less than satisfactory, since it is necessary due to the inconvenience of removing and replacing surge protectors especially under field conditions.

To facilitate the periodic replacement of surge protectors, the prior art has provided an auxiliary device which detachably holds, by snap engagement, a surge protector manufactured without leads, and which in turn is permanently soldered to the appropriate contacts within the fixed device. As will be appreciated by those skilled in the art, electrically conductive members are inductive and interfere with the calibration of special devices, such as surge protectors. In the former arrangement, the leads associated with the surge protector provided undesirable inductance. The inductance is materially increased by the substantially larger conductor members associated with the latter arrangement.

Other inherent limitations associated with the prior art have defied solution until the advent of the instant invention. For example, periodic servicing of the surge protector necessitates removal of the cover plate from the fixed device. The removal of the cover plate is laborious, in view of the several mounting bolts which must be removed, and is deleterious to the electronic components within the housing by reason of exposure to the environment, as well as the possibility that a hermetic seal will not be achieved upon closure. Although it is desirable to install surge protectors periodically throughout the system, the number and location of surge protectors is pre-determined and limited by the availability of hollow body fixed devices, such as amplifiers and directional taps. A surge protector could not be installed with a coupler, for example.

It would be highly advantageous, therefore, to remedy the inherent deficiencies associated with the prior art.

Accordingly, it is an object of the present invention to provide an improved surge protector assembly for installation into a cable transmission system.

Another object of the invention is the provision of an assembly for detachably holding a readily replaceable surge protector.

And, another object of the invention is the provision of means for installing a surge protector into a wider assortment of fixed devices than heretofore possible.

Still another object of the instant invention is the provision of means whereby a surge protector may be serviced, installed and removed, from the system while preserving the sealed integrity of the fixed device.

A further object of the invention is to provide a surge protector assembly which can be readily and conveniently incorporated into new or pre-existing transmission systems without modification of the conventional components thereof.

And a further object of this invention is the provision of the surge protector assembly which will eliminate the need for permanent, or semi-permanent, attachments, such as solder joints.

Still a further object of the present invention is to provide a surge protector assembly which is adjustable to accommodate differences in specifications and manufacturing tolerances amoung fixed devices.

Yet a further object of the invention is the provision of means for bringing the surge protector directly against the contact and dispensing with the conventional inductive intermediate conductor member.

Briefly, to achieve the desired objectives of the present invention, in accordance with the preferred embodiment thereof, first provided is an electrcially conductive body having an axial bore extending therethrough. An electrically conductive inner body is moveably disposed within the bore of the outer body. A socket is formed in one end of the inner body and detachably holds a surge protector device and is in electrical engagement with one of the contacts thereof. Means are carried at one end of the outer body for detachable securement to the access port of a fixed device. The inner body is adjustably moved within the outer body to bring the other contact of the surge protector against the contact means within the fixed device.

In accordance with a further embodiment, helical camming means are carried within the bore of the outer body, which matingly engage complementary helical camming means carried by the inner body. Accordingly, rotation of the inner body advances the inner body in one direction, while counter-rotation of the inner body advances the inner body in a reverse direction. A hollow cap is engaged over the exposed end of the outer body enclosing the inner body. First sealing means carried by the outer body provide an hermetic seal between the outer body and the fixed device. Second sealing means carried by the outer body provide an hermetic seal between the outer body and the cap.

The foregoing and further and more specific objects and advantages of the instant invention will become readily apparent to those skilled in the art from the following detailed description of a preferred embodiment thereof taken in conjunction with the drawings in which:

FIG. 1 is a perspective view of a fragmentary section of a cable transmission system illustrating a directional tap as representative of a typical hollow body fixed device, and having a surge protector assembly constructed in accordance with the teachings of the instant invention in combination therewith;

FIG. 2 is a perspective view of a fragmentary section of a cable transmission system illustrating a coupler as representative of a typical solid body fixed device and having a surge protector assembly of the instant invention connected thereto;

FIG. 3 is a plan view generally corresponding to the illustration of FIG. 2 and partially broken to reveal greater detail;

Figure 4:
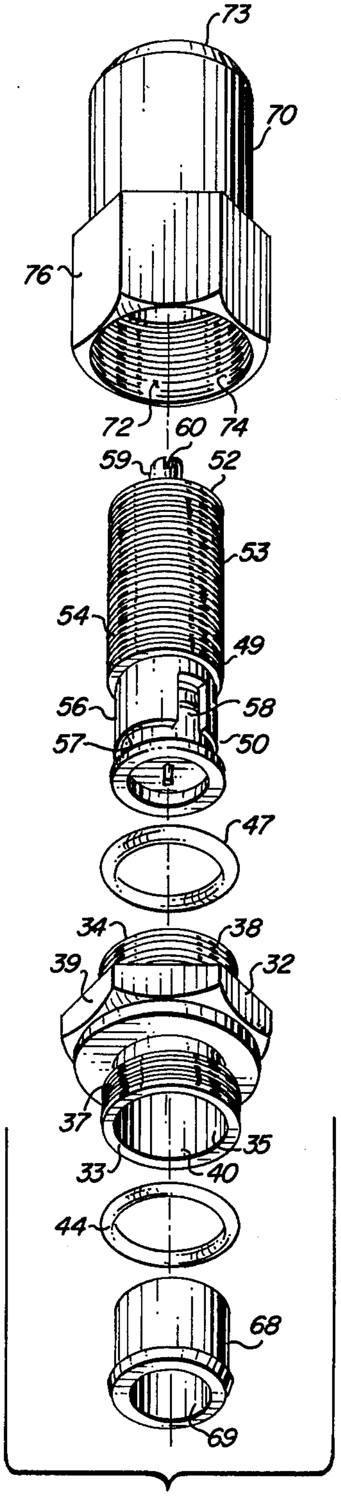
FIG. 4 is an exploded perspective view of a surge protector assembly of the character of the instant invention as illustrated in combination with the devices of FIGS. 1 and 2.

Turning now to the drawings, in which similar reference characters indicate corresponding elements throughout the several views, attention is first directed to FIG. 1, which shows a fixed device herein specifically illustrated as a directional tap, generally designated by the reference character 10, and generally representative of amplifiers and other fixed devices having hollow bodies. Directional tap 10 is held by support cable 11 and installed into transmission cable 12. Transmission cable 12 is a co-axial cable having a solid center conductor 13 surrounded by dielectric material 14 and encased in an outer tubular conductor 15. Directional tap 10 is provided with connection ports 17 and access ports 18, the latter normally sealed by closure members 19. Connector assemblies 20 electrically and mechanically communicate between cable 12 and respective connection ports 17.

The foregoing description briefly outlines apparatus and assemblies which are conventional and well known in the art. All components identified are readily available from standard commercial suppliers. The device illustrated has a cover plate on the underside thereof which is hermetically sealed and held by several screws to provide access to electronic components in the interior of the housing. One of the components normally residing within the housing is a surge protector. In accordance with conventional practice, attachment means are provided on the cover for connection with drop leaves. The foregoing and further details of the device described will be immediately apparent to those skilled in the art to which the instant invention pertains.

A surge protector assembly generally designated by the reference character 22, and constructed in accordance with the teachings of the instant invention, is illustrated as detachably connected with one of the access ports 18 instead of the usual closure member 19.

Surge protector assembly 22, as seen in FIG. 2, is used in combination with a fixed device illustrated as a coupler 23 which is intended to be generally representative of typical solid body fixed devices. Referring also to FIG. 3, it is seen that coupler 23 includes connection ports 24 and access ports 25, which are internally threaded to receive closure member 19 and connector assemblies 20. Within coupler 23 are electric contact means 27 which receive center conductor 13 and electrically insulated from the body of coupler 23 by insulator 27. Dieletric plug 29 is threadedly engaged within access port 25 and carries machine screw 30. Machine screw 30 is used to clamp center conductor 13 within electric contact means 27. The foregoing and further details of couplers, such as represented by coupler 23, will be readily apparent to those skilled in the art. The brief description is presented herein to provide a setting for the ensuing detailed description of the surge protector assembly of the instant invention.

Figure 5:
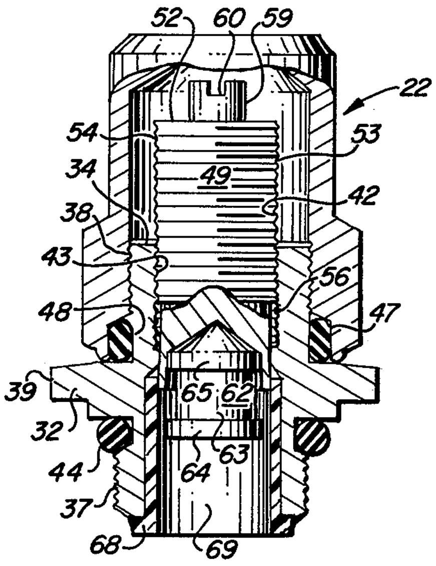
FIG. 5 is a vertical sectional view of the assembled device of FIG. 4.

Attention is now directed to FIGS. 4 and 5, which illustrate in detail surge protector 22. Seen is outer body 32 having first end 33 and second end 34, and axial 35 extending therethrough and open at each end 34 and 35. First engagement means 37 proximate first end 33 are in the form of an external thread which is detachably engageable within access ports 25 and 18 instead of the normal closure member 19. Second engagement means 38 are carried proximate second end 34. As a manufacturing expediency, second engagement means 38 is an external thread of the same dimension as first engagement means 37. Hexagon section 39 intermediate ends 33 and 34 is formed to standard specifications to receive a conventional wrench for tightening outer body 32 in the respective access port. A first section 40 of bore 35 extending from first end 33 is smooth-walled, while a second section 42 extending inwardly from second end 34 carries internal helical camming means 43 which, to facilitate manufacturing, may be in the form of a female machine screw thread.

First sealing means, in the form of O-ring 44, carried in appropriate groove 45, forms an hermetic seal between outer body 32 and the fixed device to which it is connected. Second sealing means, in the form of O-ring 47, are carried in groove 48. As will be appreciated by those skilled in the art, hermetically sealing the interior of the fixed device is a primary concern.

Inner body 49 having first and second ends 50 and 52, respectively, has a section 53 thereof extending from second end 52 which carries an external helical camming means matingly engageable with camming means 43 within bore 35 of outer body 32. Second section 56 extending from first end 50 has a smooth exterior wall. A socket 57 is formed in first end 50 and bifurcated by a pair of diametrically opposed slots 58. Projection 59 extends from second end 52 and has transverse slot 61 therein for receiving the tip of a conventional screwdriver. It will be appreciated that, due to the mating camming helical camming means 43 and 54, rotation of inner body 49 in one direction will advance inner body 49 towards first end 33 of outer body 32, while counterrotation will result in advancement in a reverse direction, i.e., away from first end 33.

Illustrated herein is a surge protector 62 of conventional configuration. The illustration is intended to depict the device commercially available from Siemens Corp., Iselin, N.J., and designated "gas filled surge voltage protector". The device has a cylindrical body 63 with first and second ends 64 and 65, which also function as electrical contacts. Socket 57 is sized and shaped to retain surge protector 62. For complementing the particular surge protector device illustrated socket 57 is provided with internal annular shoulder 67, which grips either end 64 or 65. In accordance with the manufacturing specifications of Siemens Corp., body 63 is manufactured of glass, while ends 64 and 64 are metallic.

Tubular member 68, having bore 69 therethrough, is sized to be frictionally received and retained within first section 40 of axial bore 35. Bore 69 is of sufficient size to receive surge protector 62 and second section 56 of inner body 49 therethrough. Tubular member 68 is formed of a dielectric material and functions to insulate first end 64 of surge protector device 62 from outer body 32. Second end 65 of surge protector device 62 is in electrical contact with the outer housing of the respective fixed device through inner body 49 and outer body 32, each of which are manufactured of an electrically conductive material.

Second end 34 of outer body 32 and inner body 49 are enclosed within hollow cap 70, having open end 72 and closed end 73. Internal thread 74, extending from first end 72, matingly engages second engagement means 38 of outer body 32. Hexagon section 76 is sized to receive a conventional wrench.

Figure 6:
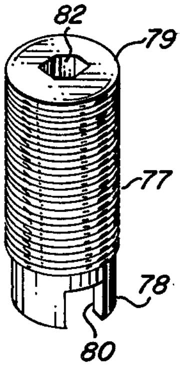
FIG. 6 is a perspective view of an alternate embodiment of an inner body useful in connection with the assembly of FIG. 4.

FIG. 6 illustrates an alternate inner body, designated 77, and in general similarity to inner body 49 has first and second ends 78 and 79 and socket 80. Formed in second end 79 is a hexagon socket 82 for receiving a conventional Allen wrench for the purpose of rotating inner body 77 relative outer body 32.

The surge protector assembly of the instant invention is readily and conveniently installed into a fixed device, such as represented by directional tap 10 and coupler 23, by first removing a closure member 19 and engaging outer body 32 with the respective access port. Inner body 49 is then rotated, bringing the surge protector device against and in electrical connection with the electrical contact means, such as represented by machine screw 30. Subsequently, hollow cap 70 is engaged with outer body 32. The inner body is readily adjusted to compensate for the depth of the electrical contact means within the access port. O-rings 44 and 47 preserve the sealed integrity of the fixed device. The surge protector device 62 is inspected or serviced by simply removing hollow cap 70 and rotatably withdrawing inner body 49.

Various modifications and changes to the device herein chosen for purposes of illustration will readily occur to those skilled in the art. For example, while the outer body, inner body and cap are preferably fabricated of aluminum, and the tubular member is preferably fabricated of Teflon, other appropriate electrical respectively conductive and insulative materials are contemplated. Similarly, other camming means can effect the relative movement between the inner body and the outer body. In this regard, the inner body can be slideably disposed within the outer body and positionally retained by a set screw threadedly engaged within the wall of the outer body or a compression spring interacting between the second end of the inner body and the closed end of the cap. To the extent that such modifications and variations do not depart from the spirit of the invention, they are intended to be included within the scope thereof, which is limited only by a fair interpretation of the appended claims.

Having fully described and disclosed the present invention in such clear and concise terms as to enable those skilled in the art to understand the practice the same, the invention claimed is:

1. A surge protector assembly for holding a surge protector device, which device includes:
   a body having first and second electrically conductive ends, and for detachably installing said device into a cable transmission system, which system includes
   a fixed device having electrical contact means therein and having an access port with engagement means communicating with said contact means, said surge protector assembly comprising:
   (a) an electrically conductive outer body having first and second ends and an axial bore extending between said ends;
   (b) complementary engagement means proximate the first end of said body for detachable connection with the engagement means of said fixed device;
   (c) an electrically conductive inner body having first and second ends and moveably disposed within the bore of said outer body;
   (d) retention means proximate the first end of said inner body for holding said surge protector device and electrically contacting the first end thereof; and
   (e) advancement means for effecting relative axial movement between said inner body and said outer body whereby the second end of said surge protector is urged into electrical contact with said contact means.

2. The surge protector assembly of claim 1, wherein said advancement means includes:
   (a) helical camming means carried within the bore of said outer body; and
   (b) complementary helical camming means carried by said inner body and matingly engaged with said helical camming means, whereby rotation of said inner body advances said inner body in one direction relative said outer body and counter-rotation of said inner body advances said inner body in a reverse direction.

3. The surge protector assembly of claim 2, further including means proximate the second end of said inner body for operatively receiving a rotatable driving tool.

4. The surge protector assembly of claim 1, wherein retention means includes a socket for receiving and detachably holding the second end of said surge protector device.

5. The surge protector assembly of claim 1, further including an insulator element carried within said bore and having an opening for receiving the first end of said surge protector device therethrough and electrically insulating said device from said outer body.

6. The surge protector assembly of claim 1, further including a hollow cap having an open end detachably engageable with the second end of said outer body and having a closed end for enclosing the second end of said inner body and the second end of said outer body.

7. The surge protector assembly of claim 1, further including a first sealing element carried by said outer body for effecting an hermetic seal between said outer body and said fixed device.

8. The surge protector assembly of claim 6, further including a second seal element carried by said outer body for effecting an hermetic seal between said outer body and said cap.

* * * * *